United States Patent [19]

Waller

[11] 4,044,991
[45] Aug. 30, 1977

[54] HIGH ENERGY LOSS FLUID FLOW CONTROL DEVICE

[75] Inventor: Henry A. Waller, Woodland Hills, Calif.

[73] Assignee: Consolidated Controls Corporation, Bethel, Conn.

[21] Appl. No.: 619,709

[22] Filed: Oct. 6, 1975

[51] Int. Cl.² .................................... F16K 47/06
[52] U.S. Cl. ................................ 251/122; 251/126; 138/43; 138/46
[58] Field of Search ............... 138/43, 46; 251/126, 251/122; 55/399, 226, 203

[56] References Cited

U.S. PATENT DOCUMENTS

| 1,754,138 | 4/1930 | Agee | 138/43 X |
| 2,038,229 | 4/1936 | Martin et al. | 251/126 X |
| 2,293,143 | 8/1942 | Johnston | 251/126 X |
| 2,341,394 | 2/1944 | Sloan | 138/46 X |
| 2,402,729 | 6/1946 | Buchanan | 138/46 X |
| 2,658,529 | 11/1953 | Hensley | 138/46 |
| 3,095,006 | 6/1963 | Smith | 138/43 X |

FOREIGN PATENT DOCUMENTS

| 447,105 | 3/1948 | Canada | 251/126 |

OTHER PUBLICATIONS

Kent's Mechanical Engineer's Handbook, Jan. 1946 Edition, pp. 13-14.

Primary Examiner—Arnold Rosenthal
Attorney, Agent, or Firm—Mason, Kolehmainen, Rathburn & Wyss

[57] ABSTRACT

A high energy loss fluid flow control device comprises a housing having an annular wall with an inlet adjacent one end and an outlet adjacent the other end. The housing wall includes an inside surface formed with a continuous helical land and groove defining at least a part of a helical flow passage between the inlet and outlet. A valve member is mounted in the housing for movement toward and away from the inlet and has an outer surface formed with a continuous helical land and groove also defining at least a part of the helical flow passage extending between opposite ends of the member. The land of the valve member projects into the groove of the housing and the land of the housing wall projects into the groove of the valve member forming the continuous helical flow passage extending between the inlet and outlet and means is provided for supporting the valve member in the housing for relative rotation to move toward and away from the inlet to lengthen or shorten the continuous flow passage as desired.

17 Claims, 10 Drawing Figures

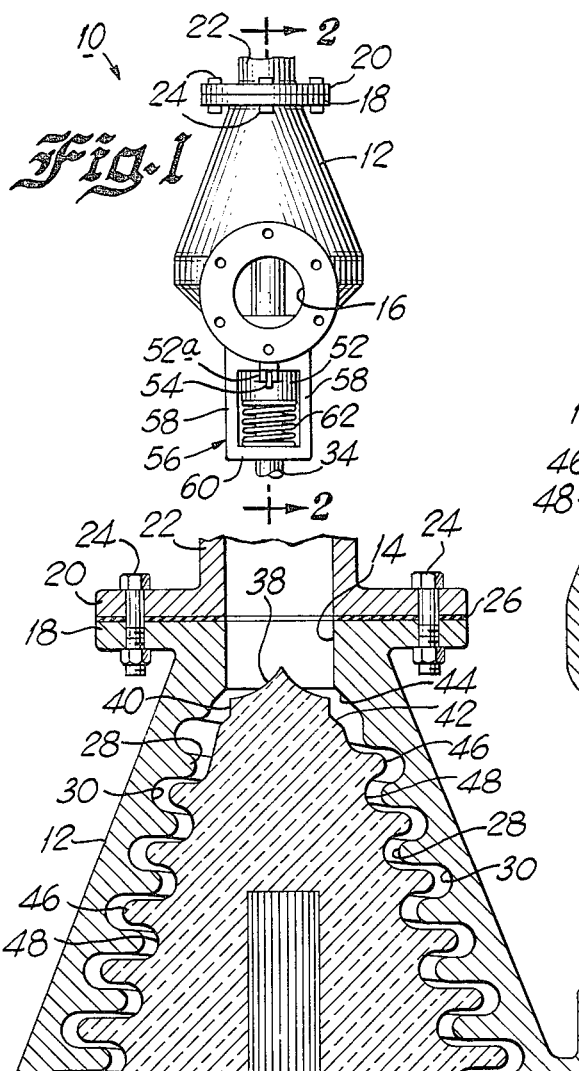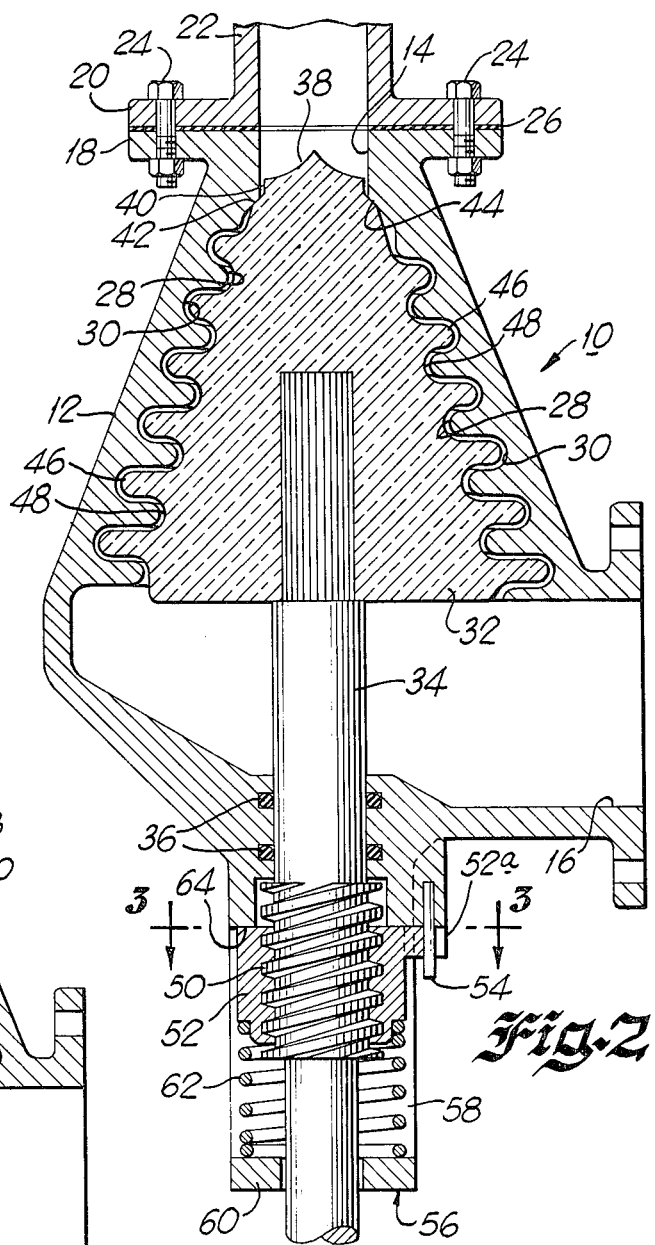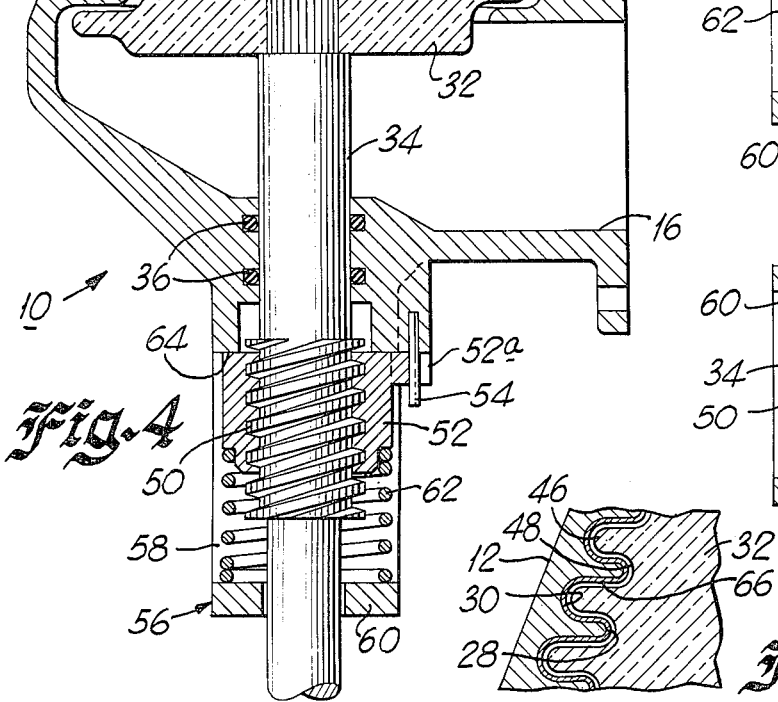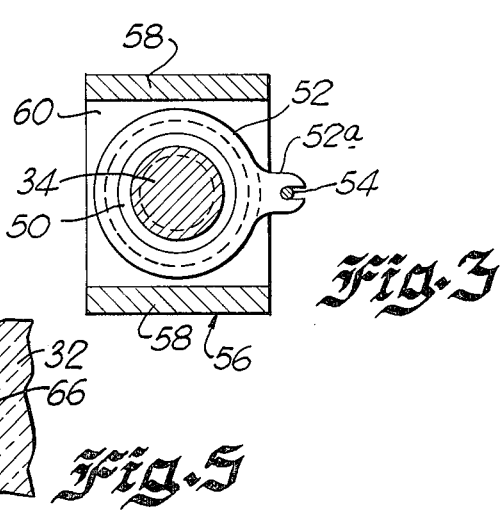

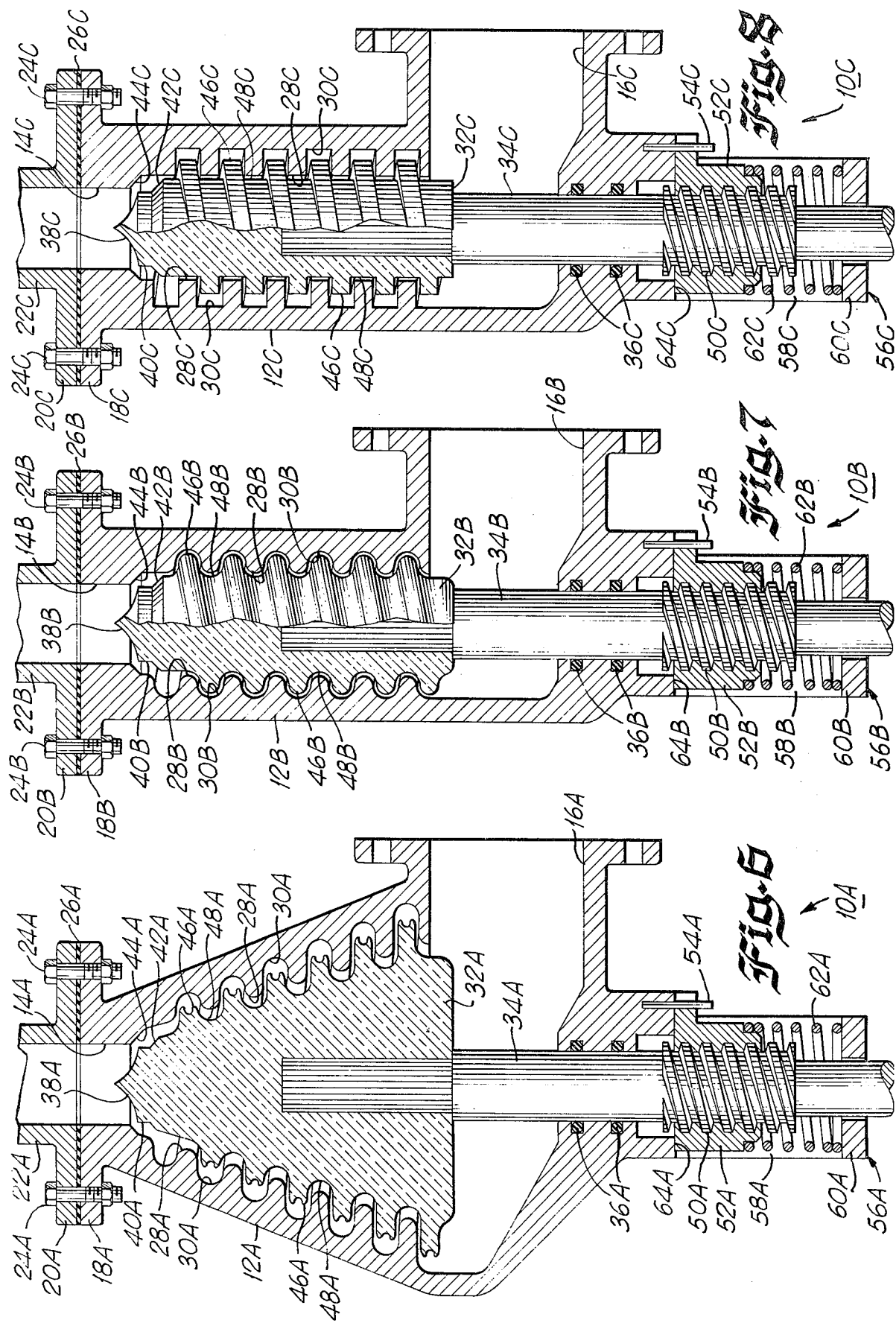

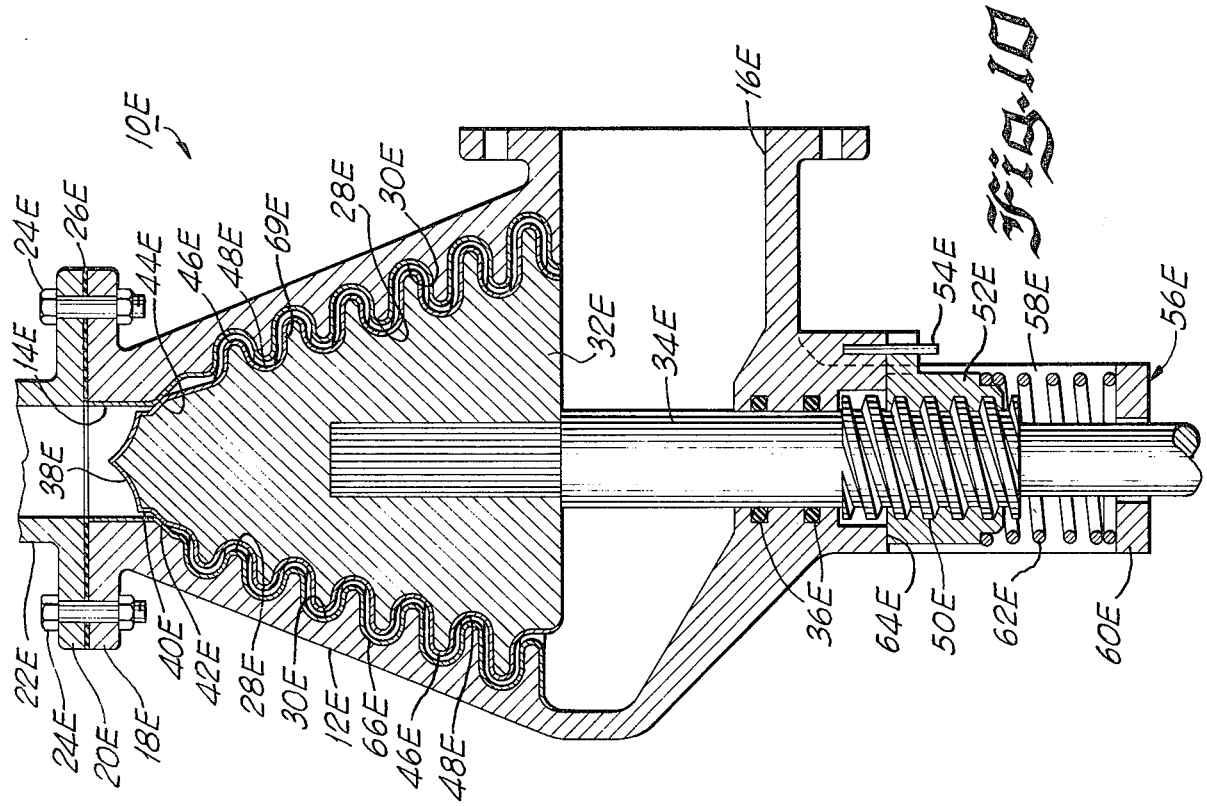
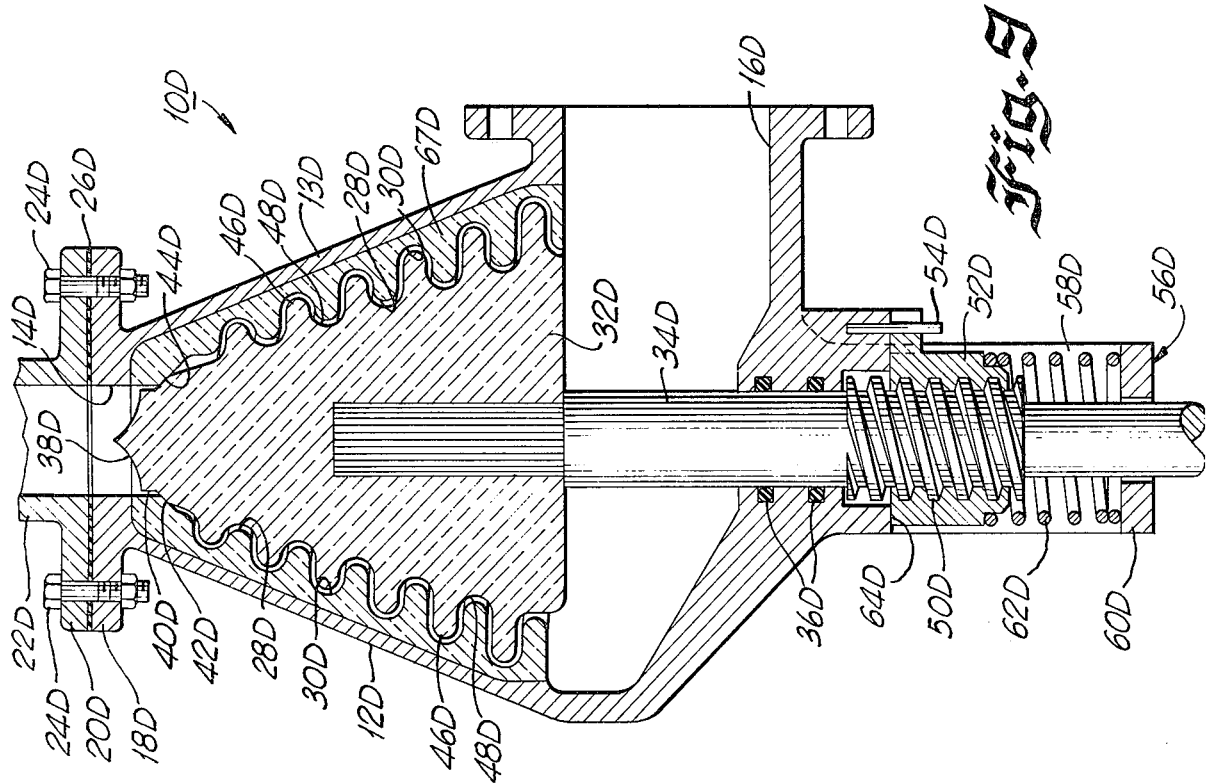

HIGH ENERGY LOSS FLUID FLOW CONTROL DEVICE

BACKGROUND OF THE INVENTION

1. Field of the Invention

The present invention relates to high energy loss fluid flow control devices and more particularly relates to devices sometimes known as let down valves and the like used for reducing the pressure of fluids received from high pressure systems to lower levels for exhausting to the atmosphere or for use in systems operating at lower pressures. Devices in accordance with the present invention are useful in the controlled reduction of fluid pressures from very high process pressures down to atmospheric pressure or less as may be used in low pressure systems. In the petroleum industry, devices of this general category are often called chokes or throttling valves and similar devices are used in submarines for discharging air from ballast tanks into the water in a controlled manner with low noise level being a requisite. Devices in accordance with the invention are also useful for flashing of high pressure liquids into gases or for rapid expansion of gases to much lower pressures for cooling application. High pressure loss fluid flow control devices are also useful in coal gasification systems and in liquification systems wherein the working fluid medium is at high pressure and high temperature and also contains abrasive solid particles such as char.

2. Description of the Prior Art

Several high pressure fluid energy loss control devices are shown in U.S. Pat. Nos. 3,451,404; 3,513,864; 3,207,181; 3,331,396; 3,426,797 and 3,514,074. The devices shown in these prior art patents utilize a plurality of parallel flow passages and in some of the devices the passages are formed by a plurality of disks having slots or grooved passageways formed therein. In the disk devices the fluid pressure is reduced in discrete steps or incraments and is not a continuous and smooth pressure reduction and in some devices the flow area is changed by adding or subtracting parallel flow paths.

It is an object of the present invention to provide a new and improved high energy loss fluid flow control device.

More particularly, it is an object of the invention to provide a device of the character described suitable for use in coal gasification systems wherein the fluid medium is a high pressure, high temperature, and contains highly abrasive solid particles such as char particles.

Another object of the invention is to provide a new and improved high energy loss fluid flow control device of the character described wherein a maximum pressure drop is obtained with a minimum of noise being generated.

Another object of the present invention is to provide a new and improved fluid flow control device of the character described which provides a continuous pressure reduction from high pressure to low pressure without discrete steps or increments.

Another object of the present invention is to provide a new and improved high pressure fluid flow control device wherein the cross-sectional area of the flow passage is continuously and gradually increased and wherein the length of the continuous passage is adjustable.

Another object of the present invention is to provide a device of the character described wherein both length and the cross-sectional area of the continuous flow passage is adjustable to provide the desired expansion ratio.

Another object of the present invention is to provide a new and improved device of the character described wherein a flow restriction is provided upstream of a valve seating surface to prevent high velocity flow during the initial opening of the valve.

Another object of the present invention is to provide a new and improved flow control device of the character described wherein surfaces defining the continuous flow passage on the valve member and housing do not come into direct contact with one another.

Another object of the present invention is to provide a new and improved fluid flow control device suitable for use in flashing liquids to gas.

Another object is to provide a device suitable for use with fluid slurries containing solid particles and the like.

Another object of the present invention is to provide a new and improved high energy loss fluid flow control device wherein the length and/or flow area of a continuous flow passage is infinitely variable to provide a continuously variable throttling action of the fluid medium.

Another object is to provide a new and improved high energy loss fluid flow control device wherein relative rotation or grinding action between the valve and a seating surface is provided so that contamination solids or particles that may have collected on the seating surfaces during operation are readily removable.

Another object of the present invention is to provide a new and improved high energy loss fluid flow control device having the capability of handling high temperature fluid medium up to the range of 2100° F through utilization of simplified ceramic construction.

Still another object of the present invention is to provide a new and improved device of the character described wherein the member is movable relative to a seat with both rotary and linear action and wherein both axial and circumferential helical flow through the device is controllable to control both the amount of fluid turbulance and the pressure loss for a particular flow area.

Another object of the present invention is to provide a high energy loss fluid flow control device having a throttle passage of helical configuration having a length which is variable to provide the desired expansion ratio.

Still another object of the present invention is to provide a high energy loss fluid flow control device having a continuously increasing flow area from the high pressure inlet to the low pressure outlet.

Another object is to provide a new and improved flow control device of the character described which has no sharp notches, corners or edges that might act as points of stress concentration.

Another object of the invention is to provide a new and improved flow control device of the character described having a flow passage defined by elements and surfaces entirely formed in part of ceramic material.

BRIEF SUMMARY OF THE INVENTION

The foregoing and other objects of the present invention are accomplished in one of the illustrated embodiments herein comprising a high energy loss fluid flow control device having a housing with an annular wall, an inlet adjacent one end and an outlet adjacent another end. The housing wall has an inside surface formed with a continuous helical land and groove defining at least a part of a helical flow passage between the inlet and outlet. A valve member is mounted in the housing for movement toward and away from the inlet and has an outer surface formed with a continuous land and groove defining at least a part of the helical flow passage. The land of the valve member projects into the groove in the housing wall and the land of the housing wall projects into the groove of the valve member to form the continuous flow passage. Means is provided for supporting the valve member in the housing for relative rotational movement and linear movement toward and away from an inlet seating surface to lengthen and shorten the helical flow passage as desired.

BRIEF DESCRIPTION OF THE DRAWINGS

For a better understanding of the present invention reference should be had to the following detailed description taken in conjunction with the drawings, in which:

FIG. 1 is a side elevational view of a high energy loss fluid flow control device constructed in accordance with the features of the present invention;

FIG. 2 is a longitudinal cross-sectional view taken substantially along lines 2—2 of FIG. 1, showing the device with the valve member in a closed position;

FIG. 3 is a transverse cross-sectional view taken substantially along lines 3—3 of FIG. 2;

FIG. 4 is a longitudinal cross-sectional view similar to FIG. 2 but illustrating the device with the valve member in an open or operating position;

FIG. 5 is a fragmentary longitudinal sectional view of a modified device like that of FIG. 1 but employing a ceramic coated internal housing surface;

FIG. 6 is a longitudinal cross-sectional view illustrating another embodiment of high energy loss fluid flow control device constructed in accordance with the features of the present invention;

FIG. 7 is a longitudinal sectional view of yet another embodiment of a high energy loss fluid flow control device constructed in accordance with the features of the present invention;

FIG. 8 illustrates still another embodiment of a high energy loss fluid flow control device constructed in accordance with the features of the present invention.

FIG. 9 illustrates still another embodiment of a high energy loss fluid flow control device constructed in accordance with the features of the present invention.

FIG. 10 illustrates still another embodiment of a high energy loss fluid flow control device constructed in accordance with the features of the present invention.

DESCRIPTION OF THE PREFERRED EMBODIMENTS

Referring now more particularly to FIGS. 1-4 of the drawings therein is illustrated a new and improved high energy loss fluid flow control device indicated generally by the reference numeral 10 and constructed in accordance with the features of the present invention.

The device 10 is commonly known as a high pressure let down valve and will be referred to as a let down valve hereinafter. The let down valve includes a tubular body of housing 12 having a fluid inlet opening 14 adjacent one end and an outlet or discharge opening 16 formed in the side wall adjacent an opposite end and somewhat larger in diameter than the inlet. The inlet end of the valve body is provided with an annular flange 18 adapted to be coupled with the flange 20 of a high pressure fluid supply conduit 22. The flanges are coupled together with a plurality of coupling bolts 24 and a sealing gasket 26 is provided to form a fluid tight seal betwee the faces of the flanges.

The valve body 12 is formed with a generally frustroconical wall section between the inlet flange and the oulet and has a continuous helical land 28 and groove 30 formed on the inside surface of the tubular wall between the inlet and outlet. A valve member 12 of a similar, generally frustroconical shape is mounted in the tubular housing and is supported on the end of a spindle or shaft 34 which projects downwardly through an opening in the lower housing wall and is sealed by a pair of O-rings 36. The valve member is formed with a generally conically shaped pointed upper end portion 38 and a cylindrical side wall surface 40 extends downwardly thereof having a diameter slightly less than the internal diameter of the inlet passage 14 of the tubular housing. Below the cylindrical surface 40, the valve member is provided with a frustroconical seating surface 42 adapted to seal against a matching annular frustroconical seating surface 44 formed on the inside wall surface of the valve body below the inlet passage 14. The seating surfaces could also be spherical in shape or flat.

Referring to FIG. 2, when the valve member 32 is in a closed position, the frustroconical seating surface 42 on the valve member seats tightly against the frustroconical seating surface 44 on the wall of the valve body 12 to close off fluid flow through the valve. Below the valve seating surface 42, the valve member 32 is formed with a continuous helical land 46 and groove 48 dimensioned to loosely interfit with the land 28 and groove 30 on the inside wall surface of the valve body 12. The interfitting land of one member projecting in the groove of the other and vice versa from a continuous helical flow passage extending between the inlet and the outlet 16 of the valve for controlling the flow of fluid as it expands.

The spindle 34 is provided with a threaded section 50 having threads of the same pitch as the threads or lands 28 and 46 on the housing wall and the valve member 32. The threaded section 50 of the spindle is threadedly engaged within an annular collar 52 having a radial ear 52a formed with a slot in order to accommodate a shear pin 54 projecting downwardly from the valve body to prevent relative rotation of the collar on the body when the spindle is rotated to open or close the valve member 32. The annular collar is mounted within an enclosure 56, preferably formed on the main valve body 12 and having a pair of parallel side walls 58 and a bottom wall 60 with an aperture for the spindle 34. A relatively strong helical spring 62 is coaxially mounted on the spindle 34 between the wall 60 and the collar to firmly bias the collar upwardly against a flat surface 64 on the lower end of the valve body as shown in FIGS. 2 and 4. The coil spring 62 is of a strength sufficient to normally hold the collar 52 tightly against the flat surface 64 with normal rated pressures when the valve member 32 is in a closed position (FIG. 2). In the event excessive pressure is encountered the spring 62 may be compressed slightly permitting the valve member 32 to move downwardly slightly for relieving the excess pressure. In addition, when the valve member engages the seat, additional rotation, resulting in grinding of the member into the seat, is permitted by axial translation of the collar afforded by the spring 62. The valve member 32 is rotated within the valve housing 12 and the interfacing surfaces on the lands and grooves on the housing and valve member defining the helical flow passage do not come in direct physical contact during normal operation of the valve with fluid flowing along the passage.

In accordance with the present invention, when the let down valve 10 is in a closed condition as shown in FIG. 2, the seating surfaces 42 and 44 on the valve member 32 and the housing 12 respective are in sealed contact against each other as shown. Because the valve member 32 is shaped to include with a short upwardly extending cylindrical section 40 adjacent the upper end having a diameter slightly less than that of the inlet passage 14, when the valve member is initially opened by rotation of the spindle 34 there is initially provided a flow restriction upstream of the seating surfaces and this restriction prevents high velocity across the valve seat during the initial valve opening. After the valve has opened sufficiently the restriction is removed as the cylindrical segment 40 passes below the lower end of the inlet passage 14. In the final stages of closing of the valve member 32 a similar flow restriction also occurs just prior to final seating. This prevents large contaminate particles from entering the seating area defined between the frustroconical seating surfaces 42 and 44. Any contaminate material that may already be present in the area adjacent the seating surfaces 42 and 44 as the valve is closed by rotation of the spindle 34 as permitted by axial translation of the collar 52, is normally ground away, crushed and/or pushed aside so that excellent seating is achieved and the area is freed of the solid material collected.

After the valve is opened far enough to overcome the initial flow restriction between the passage 14 and surface 40 on the valve member 32, throttling action of the fluid medium takes place as the fluid flows along the continuous helical flow passage defined by the interfitting lands and grooves on the valve member and valve housing. The expansion ratio of the fluid is controlled by the angle of the frustroconical members and the length of the conical flow passage. The length of the flow passage is shortened as the spindle 34 is rotated to move the valve member 32 towards a more fully opened position. In addition, as the valve is more fully opened as shown in FIG. 4, the cross-sectional flow area of the conical flow passage is increased. The let down valve 10 provides a capability for changing both the length and the cross-section of the continuous helical flow passage in order to provide the desired, precisely controllable degree of throttling action or pressure reduction. This fluid expansion is continuous rather than in discrete steps. Because the pitch of the threads 50 on the spindle 34 is the same as the pitch of the lands and grooves on the mating valve member and housing wall, the valve member 32 is able to float within the housing 12 and the interfitting lands and grooves of the two members are separated by the fluid media and do not come in direct contact with each other. This isolation by the flowing fluid minimizes wear on the valve and also permits the use of low precision threads or lands and grooves which can be formed in a casting process or the like, rather than by machining. The lands and grooves on the valve member 32 and housing 12 may be rounded as shown to eliminate any sharp notches which might act as pockets of stress concentration in high pressure, high temperature applications. The angle of the frustroconical valve member 32 and matching housing 12 may be selected as desired to provide an optimum angle for the desired mix between circumferential flow and axial flow of the fluid medium between the high pressure inlet and the low pressure outlet. Also, the frustroconical shape may be concave or convex to provide further desirable operating characteristics for the valve with selected operating pressure ranges and selected fluid media.

Referring now to FIG. 5, because the flow passage walls of the continuous helical flow passage are not normally in direct contact with each other, the lands and grooves 28 and 30, and 46 and 48 of the housing 12 and the valve member 32, respectively, need not be machined, but may be formed in a casting process. The inside surface of the housing 12 is coated with a temperature and wear resistant ceramic coating 66 and provides a capability for handling extremely high temperature, high pressure fluid media.

Referring now to FIG. 6, therein is illustrated another embodiment of a let down valve constructed in accordance with the features of the present invention and referred thereto generally by the numeral 10A. Identical reference numerals with the suffix A will be utilized for the components of the valve 10A which are identical or similar to the corresponding components of the valve 10 of the first described embodiment. The let down valve 10A differs from the valve 10 in that the lands 28A on the valve body 32A are formed with a center groove or indentation 29 in order to promote vortexing or swirling action of the fluid media as it flows through the valve. The extra clearance and/or cross-sectional area provided between the groove 29 formed on the land 28A and the groove 48A of the housing 12A promotes circumferential flow of the fluid media through the valve member during the expansion process around the helical flow passage. In addition, swirling or vortex action in the passage is increased to provide more turbulence and higher pressure loss.

Referring now to FIG. 7, therein is illustrated yet another embodiment of a let down valve constructed in accordance with the features of the present invention and referred to generally by the reference numeral 10B. The valve 10B includes a generally cylindrical body or housing 12B and a valve member 32B which is also generally cylindrical instead of frustroconical in shape. Accordingly, as the valve member is opened and moved away from the closing seating surface, the cross-sectional flow area of the helical flow passage is not substantially changed but only the length of the flow passage is altered. The valve 10B, thus provides means for selectively adjusting the length of the helical flow passage without the effective flow area changing.

Referring to FIG. 8, therein is illustrated yet another embodiment of a let down valve constructed in accordance with the features of the present invention and referred to generally by the reference numeral 10C. The valve 10C is similar to the valve of 10B except that the valve body 32C of generally cylindrical shape has a modified form of profile of thread or land 28B with a square or rectangular cross-section. In addition, the lands 28C on the wall of the housing 12C are dimensioned to provide a relatively large cross-sectional flow area for the continuous helical flow passage of the valve. In both the embodiments of FIG. 7 and 8, opening of the valve members controls only the length of the helical flow passage which is substantially uniform in cross-sectional throughout its length. In the frustroconically shaped valves 10 and 10A, the length of the helical flow passge is selectively adjustable and also the cross-sectional flow area of the passage is selectively adjustable because as the conical valve members 32 and 32A are unthreaded from their housings 12 and 12A, respectively, smaller convolutions of the valve members occupy adjacent larger diameter convolutions in the valve housing so that the effective flow area is gradually increased towards the low pressure end of the valve the more the valve is opened.

Referring now to FIG. 9, therein is illustrated yet another embodiment of a valve 10D constructed in accordance with the features of the present invention and particularly well suited for high temperature applications.

The valve 10D includes a housing 12D having an outer wall portion of metal and an insert 67D of ceramic material formed with the lands 28D and groove 30D on the inside surface to define the helical throttling passage. The valve includes a valve member 32D which is formed of refractory material so that the interfitting lands and grooves of the housing insert 67D and valve member 32D thus are able to withstand extremely high temperatures and highly abrasive fluids. The ceramic housing insert and valve member may be formed in a casting process of castable refractory material and may be coated with a flame sprayed ceramic material in accordance with the copending U.S. Pat. application Ser. No. 541,254, filed Jan. 15, 1975, which application is assigned to the same assignee as this application. Because of the unique helical flow passage of the valve of the present invention, and the fact that precision accuracy in forming the lands and grooves is not required, castable refractory material can be utilized effectively and this results in an economical high temperature capability not heretofore possible.

Referring now to FIG. 10, yet another embodiment of a valve 10E constructed in accordance with the features of the present invention is illustrated. In the valve 10E the surfaces of the land 28E and groove 30E on the housing wall are coated with a temperature and wear resistant ceramic lining 66E and the surfaces of the interfitting land 46E and groove 48E are similarly coated with a ceramic lining material 69E. The linings provide a helical flow path well able to handle fluids at temperatures up to 2100° F when applied as taught in the aforementioned copending patent application by flame spraying of ceramic material.

Although the present invention has been described with reference to several illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A high energy loss fluid flow control device comprising:
   a housing member having an annular wall with an inlet adjacent one end and an outlet adjacent another end.
   said housing wall having an inside surface formed with a continuous helical land and groove defining at least a part of a continuous helical flow passage between said inlet and outlet,
   a valve member mounted in said housing for movement toward and away from said inlet and having an outer surface formed with a continuous helical land and groove defining at least a part of said helical flow passage extending between opposite ends of said member,
   said land of said valve member projecting into said groove in said housing and said land of said housing wall projecting into said groove in said valve member forming said helical flow passage, and
   means independent of said lands and grooves supporting said valve member in said housing for relative rotation and linear movement toward and away from said inlet to lengthen and shorten said continuous flow passage without contact between opposite facing surfaces of said lands projecting into said grooves,
   said supporting means including a spindle secured to said valve member and having a threaded portion supported from said housing in threaded engagement with a support member movably mounted thereon.

2. The device of claim 1 wherein said housing and valve member include interfitting portions of generally frustroconical shape and said helical flow passage increases in radius away from said inlet toward said outlet.

3. The device of claim 1 wherein said housing and valve include interfitting portions of generally cylindrical shape and said helical flow passage is substantially constant in raduis.

4. The device of claim 1 wherein said supporting means includes a spindle having a helical thread of substantially the same pitch as said helical flow passage axially of said valve member.

5. The device of claim 4 including annular collar means in threaded engagement with said thread of said spindle and means supporting said collar means on said housing preventing relative rotation therebetween and permitting limited axial displacement of said collar means relative to said housing.

6. The device of claim 5 including resilient means biasing said collar means permitting limited axial displacement upon relative rotation between said valve member and said housing member.

7. The device of claim 1 wherein the helical land on at least one of said members is formed with a continuous helical groove facing the adjacent interfitting groove of the other of said member for increasing the cross-section of said helical flow path.

8. The device of claim 1 wherein said interfitting helical lands and grooves are dimensioned to remain free of direct contact as said support means is operated to rotate said valve member relative to said housing.

9. The device of claim 8 wherein at least one of said lands or grooves is coated with high temperature resistant ceramic material.

10. The device of claim 9 wherein said lands are dimensioned to interfit within said grooves without direct contact therebetween.

11. The device of claim 1 wherein said housing member includes an annular seating surface between said inlet and said helical flow passage and said valve member includes a matching annular seating surface adapted to seat and unseat with the seating surface of said housing member upon movement of said valve member toward and away from said inlet between closed and open positions.

12. The device of claim 11 wherein said valve member includes a projecting end portion dimensioned to extend into said inlet when said valve member is between a closed position and a selected distance away from said closed position for restricting the flow of fluid media from said inlet to said helical flow passage past said seating surfaces.

13. The device of claim 12 wherein said inlet includes a cylindrical surface and said projecting end portion includes a cylindrical surface of slightly smaller diameter to provide said flow restriction.

14. The device of claim 9 wherein said lands and grooves of both said housing and valve members have facing surfaces of high temperature resistant ceramic material.

15. The device of claim 9 wherein said valve member is formed of refractory material.

16. The device of claim 9 wherein said housing member includes a liner of temperature resistant ceramic material forming said inside surface.

17. The device of claim 16 wherein said housing includes an outer shell of metal, said liner is cast in place in said shell.

* * * * *